US006826146B1

United States Patent
Blenis et al.

(10) Patent No.: US 6,826,146 B1
(45) Date of Patent: Nov. 30, 2004

(54) METHOD FOR REROUTING INTRA-OFFICE DIGITAL TELECOMMUNICATIONS SIGNALS

(75) Inventors: James Blenis, Allen, TX (US); Leigh B. Channell, Conyers, GA (US); Gerald D. Lystad, Sinelville, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/324,488

(22) Filed: Jun. 2, 1999

(51) Int. Cl.$^7$ ................ G01R 31/08; H04M 7/00
(52) U.S. Cl. ............ 370/227; 370/241; 370/245; 379/221.04
(58) Field of Search .................. 370/241, 242, 370/243, 244, 247, 384, 381, 382, 383, 248, 225, 226, 227, 228; 379/33, 29.11, 32.02, 22.03, 221.04, 221.01, 12, 17

(56) References Cited

U.S. PATENT DOCUMENTS

| | | | |
|---|---|---|---|
| 4,616,361 A | | 10/1986 | Strehl |
| 5,329,520 A | * | 7/1994 | Richardson .............. 370/16 |
| 5,479,608 A | * | 12/1995 | Richardson .......... 395/182.02 |
| 5,636,203 A | * | 6/1997 | Shah ..................... 370/244 |
| 5,920,257 A | * | 7/1999 | Commerford ............ 370/244 |
| 6,097,696 A | * | 8/2000 | Doverspike ............. 370/216 |
| 6,154,447 A | * | 11/2000 | Vedder .................. 370/244 |
| 6,535,489 B1 | * | 3/2003 | Merchant et al. ......... 370/244 |
| 6,538,994 B1 | * | 3/2003 | Horspool et al. ......... 370/230 |

* cited by examiner

Primary Examiner—Hanh Nguyen

(57) ABSTRACT

A method of rerouting a digital intra-office signal through a telephone central office comprises the steps of retrieving identification data for ports of first and second digital access and cross-connect systems, the ports being connected by an intra-office digital trunk, retrieving identification data for an alternative path from the first cross-connect system to the second cross-connect system, correlating identification data for the alternative path to the identification data for the intra-office digital trunk, determining availability of and displaying alternative path data responsive to entry of identification data for the intra-office digital trunk, and rerouting the intra-office digital signal via the alternative path. The rerouting of digital intra-office signals through a telephone central office may be necessitated by preventative maintenance, repair and replacement of connectors and the like, to install new bays or frames of equipment and to restore service in the event of a service outage or imminent failure.

11 Claims, 4 Drawing Sheets

METHOD FOR REROUTING INTRA-OFFICE DIGITAL TELECOMMUNICATIONS SIGNALS

BACKGROUND OF THE INVENTION

1. Technical Field

The present invention relates to the field of telecommunications trunk rerouting and, in particular, to the rerouting of intra-office digital signals, for example, for maintenance or circuit rearrangement purposes or in the event of an imminent or actual intra-office cable failure.

2. Description of the Relevant Art

It is known to reroute inter-office telecommunications trunks in the event of a failure or imminent failure or for maintenance purposes. For example, a restoration system known as FASTAR, which is described and claimed in U. S. Pat. No. 5,182,744, assigned to AT&T, is being utilized within the United States toll network to assist in the automatic rerouting of inter-office facilities. Inter-office telecommunications trunks connect central offices together via various means including satellite, microwave, wireless, coaxial cable, twisted pair cable and other means. Redundancy is often provided in inter-office trunking facilities that may be path diverse (for example, satellite, microwave, optical fiber, repeatered land line, submarine cable or other inter-office facility), equipment diverse or otherwise redundant.

Intra-office signal communication, that is, transport of a signal simply across a telephone central office, however, has developed over the years with a significantly less degree of equipment, facility or other redundancy. Inside a telephone central office, there exist frames of equipment that may be spread over multiple floors of a central office building with overhead cable racks in which intra-office cables have been lying for years. Satellite and microwave dishes which receive signals from all over the world may be mounted on top of the multi-story central office building. Cable vaults underneath the building provide access to land lines below ground level. Insulation can rot on and within cables layered in cable racks or run between building floors. Individual cable pairs of wires can short together, the copper wires break open, connectors can deteriorate or come loose and the like. Cables and cable connectors can succumb to aging, environmental changes, moisture and stress causing them to deteriorate. The placement of new cable layers upon layers of existing cable, bending cables around the central office and the weight of cables stressed due to floor-to-floor drops causes cable and cable connector deterioration over time. The failure of an intra-office trunk can mean not only the instantaneous disconnect of one or more calls but, with the loss of one intra-office transport means, the efficiency of the entire telecommunications network can become at risk. Intermittent problems due to the deterioration of a cable or cable connector can cause chronic problems for a customer's service.

Referring to FIG. 1, a typical telecommunications network is shown and many terms such as intra-office, inter-office, subscriber line, central office (including local, tandem and toll offices) and the like will be defined. The North American numbering plan will be used by way of example and should not be deemed to be limiting on the scope of the present invention. Starting with a typical subscriber 101, subscriber 101 is connected to a local telephone central office by a subscriber loop or line 105. Line 105 may typically comprise a twisted wire cable pair (which may provide an asynchronous digital subscriber line connection). Line 105 may also comprise a wireless connection, for example, to a serving cellular service switch. In a cable telephony/television environment, line 105 may comprise a shared bandwidth portion of bandwidth provided via a hybrid fiber coaxial cable distribution system. Local central office 111 may be a wire center such as a #1 or #5 Electronic Switching System manufactured by Lucent Technologies serving several telephone exchanges.

Subscriber 101 may be in the 654 exchange of the 301 area code having the directory number 654-2321. Local central office 111 may be a wire center having several exchanges and will have intra-office trunks, for example, intra-office trunk 109 which can carry calls across the central office from one exchange to another exchange within the same central office to another subscriber, for example, subscriber 103 who may be in the 652 exchange of the 301 area code. Intra-office trunk 109 carries a signal across a central office in this example from one exchange to another. The interexchange, intra-office trunk is but one example of an intra-office trunk. Other examples will now be further described.

Subscriber 101 may wish to communicate with subscriber 153 in the 630 area code. As can be seen from FIG. 1, there are many alternative paths between local central office 111 serving subscriber 101 and local central office 149 serving subscriber 153 who is connected to office 149 by subscriber loop or line 151. Inter-office trunks are transport means for connecting central offices together. Examples of interoffice trunks include trunks 113, 115, 117, 123, 125, 133, 135, 137, 139, 141, 143 and 147. Subscriber 101 may be connected to subscriber 153, for example, via interoffice trunks 117 and 147. Another route might be via interoffice trunks 115, 143, 147. Another route might be via trunks 113, 123 and 141. Other routes are seen from the figure.

These alternative inter-office routes involve central offices that may not be within boundaries of a regional telephone operating company and, consequently, must involve an interexchange carrier (IXC) such as AT&T. The IXC operates and maintains tandem central offices and toll central offices one of whose functions is to provide switching or cross-connection between inter-office trunks. Tandem central office 127 connects toll offices 121 and 131 together or can connect a toll office to a tandem office, such as tandem office 145. The local exchange carrier (LEC) may also operate toll and tandem central offices, such as tandem office 145 that connects local central offices 119 and 149 together.

Telephone central offices have switching and cross-connect equipment. Many paths through an office are switched; many are not switched at all but merely cross-connected. An intra-office trunk within a toll or tandem office is defined as a telecommunications channel between two pieces of equipment within the same toll or tandem office that may or may not be switched. With reference to toll central office 121, for example, there may be an intra-office trunk or trunk group of channels that connect ports toward local central office 111 to ports toward tandem office 127. Looking at the combinations, there may be A-B, A-C, and A-D intra-office trunks, also, B-C, B-D and C-D intra-office trunks shown in FIG. 1 by dotted lines. In practice, some IXC toll offices may provide many more intra-office trunk groups than the six groups identified for toll office 121. These intra-office trunks may typically comprise pairs of wires carrying many digitally multiplexed channels. Wires go open, wires break and whole intra-office trunk groups of channels can fail when a single wire breaks or a connector fails. There is an opportunity to repair, replace or perform preventative maintenance on connectors and the like on a routine basis. Thus, there is a need in the art for a system and method for rerouting intra-office trunks. Moreover, with digital systems such as T1 digital carrier systems where a single pair of wires may represent 24 DS0 channels or T3 systems where a single pair of wires may represent 28 T1 channels, the problem becomes more complicated as all 24

DS0 or 28 T1 channels must be rerouted together and simultaneously in order to minimize service disruption. Moreover, it would be desirable if rerouting is effectuated as rapidly as possible after a determination of a necessity to reroute is made. Finally, it would be desirable if a rerouting of signals occur through the central office via alternative paths upon the detection and reporting, for example, of the event of an imminent or actual cable wire or connector that has open or shorted.

SUMMARY OF THE INVENTION

The problems and related problems of the prior art are solved according to the principles of the present invention by providing a method of rerouting an intra-office digital signal through a telephone central office comprising the steps of storing identification data for ports of first and second digital access and cross-connect systems, the ports being connected by an intra-office digital trunk, storing identification data for an alternative path from said first digital access and cross-connect system to said second digital access and cross-connect system, correlating identification data for said alternative path to said identification data for said intra-office digital trunk, determining availability of and displaying alternative path data responsive to display of identification data for said intra-office digital trunk, and rerouting said intra-office digital signal via said alternative path. A known transport maintenance alarm and surveillance system (TMAS) for monitoring digital access and cross-connect frames, digital test maintenance frames and other intra-office trunk related equipment within a central office and having an associated digital test maintenance station (DTMS), for example, that may be a Sun SPARC work station, may maintain such identification data and, with modified digital element maintenance software (DEMS), correlate the data in memory as a database. When an imminent cable failure is detected, for example, via a monitored burst of errors or when maintenance is required, the operator of a work station may be advised via display of the port identity of the failing digital signal port or port undergoing maintenance and of the availability of an alternative path through the office so that, for example, twenty-four DS0, twenty-eight T1 or more digital intra-office channels can be immediately and simultaneously rerouted.

For example, in an Alcatel cross-connect system embodiment, the software package according to the present invention (accessed, for example, via DEMS) operates within the same cross-connect system utilizing available spare ports within that system. The principles of the present invention can be extended to any central office having intra-office digital trunks for which alternative paths through the office exist including local central offices, tandem central offices and toll central offices. Moreover, the principles of the present invention may be applied to circuit rearrangement, maintenance reroute or restoration of failed or impaired services among other purposes. Other features of the present invention will be understood with reference to the accompanying drawings and to the detailed description of the invention which follows.

DETAILED DESCRIPTION

Figure 1:
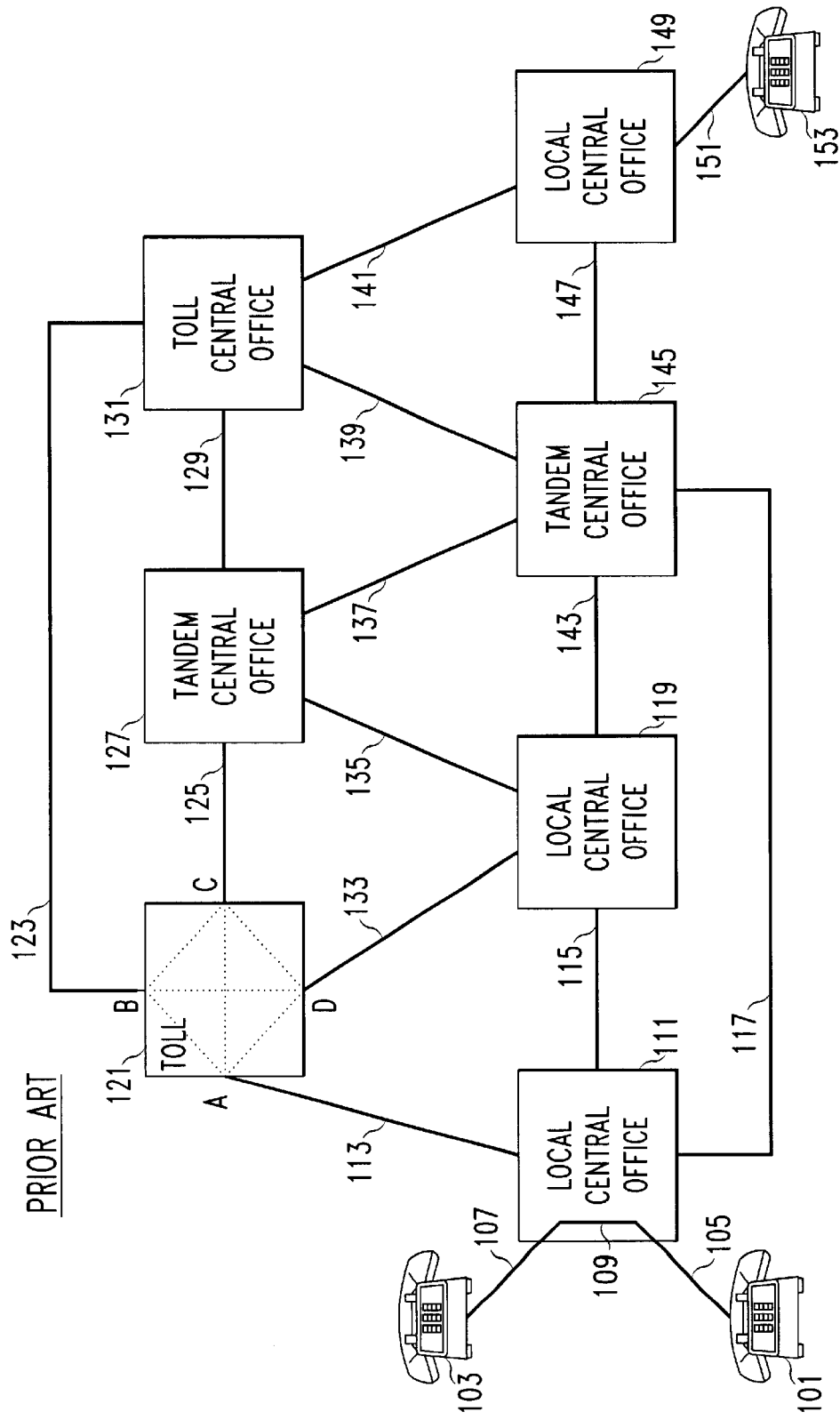
FIG. 1 provides a telecommunications network overview useful for defining terms utilized in the detailed description of the invention including intra-office trunk and local, tandem and toll central office.
Figure 2:
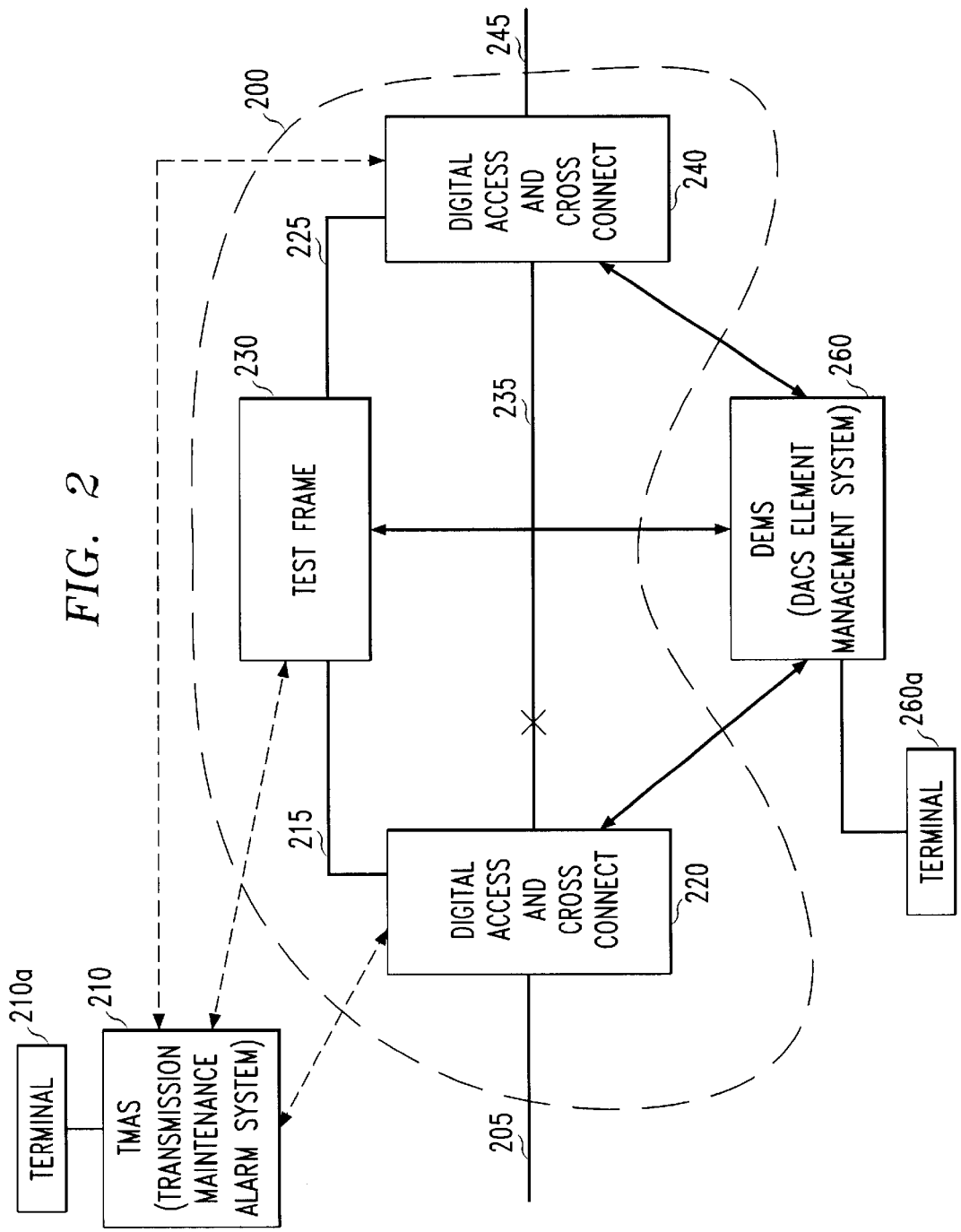
FIG. 2 provides a generalized overview of the method of the present invention whereby first and second digital access and cross-connect frames are monitored via an alarm system terminal, the terminal system including a digital computer processor for assembling a database of intra-office trunks and alternative, for example, test or other paths and a display for reporting imminent intra-office trunk failures planning for maintenance activities and reporting available alternative paths.

Referring to FIG. 2, there is shown a generalized overview of the method of the present invention whereby first and second digital access and cross-connect frames 220, 240 are monitored via system terminals 210a and 260a. Boundary line 200 may represent a central office location to demonstrate that the physical frames of equipment comprising test frame 230 and DACS frame 220, 240 are typically within a single central office location. Terminal 210a is associated with a known transmission maintenance alarm system 210. Terminal 260a is associated with a DACS element management system 260. Alarm system terminal 210a may be connected, for example, via a transport maintenance alarm and surveillance system (TMAS) to DACS 220,240 and test frame 230. Associated with TMAS 210 may be a digital computer processor and system known as an operating systems data server (OSDS) for assembling a database of intra-office trunks and alternative paths, for example, test paths or other paths associated with the intra-office trunks. The alarm system terminal 210a may be one of many terminals which may be located at the central office or remote therefrom. The terminal 210a may include a display for reporting imminent intra-office trunk failures and reporting available alternative paths. OSDS maintains and generates displays of records of intra-office trunks, both those trunks which carry traffic and those that are spare.

Associated with digital cross connect systems which may be installed in a central office may be a digital computer maintenance and testing system known as Digital Test and Maintenance System (DTMS) 230 which may be under control of the DACS Element Manager (DEMS) 260. Briefly referring to FIG. 3, test frame 230 may comprise DTMS computer 360 having a CPU 362, the DTMS computer for two way communication with DTMS bay 350 having spare test ports or spare direct tie pairs. The DEMS system 260 is preferably programmed according to a digital element maintenance system (DEMS) application software which is modified according to the present invention as described below. DEMS 260 is connected to DACS 220, 240 and DTMS 230 The operator of the terminal 210a or terminal 260a, for example, a Sun Microsystems SPARC work station, also may enter data via a keyboard or mouse which may be reflected in computer terminal display screens where the identified intra-office trunks and alternative paths may be shown. Although not shown, TMAS 210 may be connected directly to DEMS 260 in an alternative embodiment and, thus, DEMS 260 receive information directly from TMAS 210 (and vice versa).

Line 205 represents the "line" side of the digital access and cross connect frame 220 (pointing toward a network user). Line 245 represents the network side of the digital access and cross connect frame 240 (pointing toward the heart of the network). Typically, frames 220 and 240 will be located within the same central office 200 which may be a local, tandem or toll central office or, at least, within the same building. In a preferred embodiment, alarm system terminal 210a is remote from the central office in which frames 220 and 240 are located. In a preferred embodiment, alarm system terminal 210a is one of many terminals connected to a transport maintenance alarm and surveillance system 210 for monitoring many telephone central offices. For example, an interexchange carrier (IXC) may operate a TMAS system for monitoring several tandem and toll central offices.

Digital access and cross-connect system (DACS) 220 may simply terminate line 205 in ports, the point of entry to DACS frame 220. In particular, DACS 220 cross connects a T3, for example, and sends it through to a DS3 output port. DACS 220 may provide digital multiplexing functionality or simply pass the incoming signal directly through to its digitally connected output port. DACS 220 also comprises a digital data processor, controlled routing and rerouting functionality and test access points for detecting and obtaining certain measurements on the digital signals flowing through it. For example, DACS 220 is capable of measuring bit error rate or other measure of the viability of a digital data stream signal it cross-connects. In particular, DACS 220 may be a DACS III which provides digital signal access and cross-connects but does not multiplex. A T3 digital carrier signal comprising twenty-eight digital channels presented at a line side port is cross-connected within and provided directly to an output port of the frame, for example, via line 235. DACS 220 has multiple input ports and multiple output ports although only one is shown for simplicity. Its primary functionality is to provide digital access to the digital bit streams presented at the input and output ports and, during provisioning operations, cross-connect the digital signals in a predetermined manner according to a trunk circuit provisioning process.

Some DACS frames have the capability of further multiplexing the individual channels. In other words the twenty eight channels of a T3 trunk group entering the DACS 220 may be cross-connected to a T3 system having different channels from other T3 systems or to twenty-four channel T1 systems. For example, in the following known DACS frames, the DACS 3/1 (the Alcatel 1631, for example), DACS IV, DACS II, DACS II CEF and so on, a T3 into the frame does not have the same channel composition as a T3 out of the frame. The T3 output of the DACS will have different identification data than the T3 input to the DACS. Because of the DACS 3/1 architecture, every T1 must be broadcast or double fed individually to create a new T3 (or vice versa).

A modified DEMS software package to incorporate a functionality hereinafter referred to as the TOOL runs on the DEMS element management system 260, which comprises a data processor not shown, and operates the rerouting of intra-office trunks according to the present invention. The TOOL operates on the first and second digital access and cross-connect frames, for example, frames 220, 240 to create the new rerouted T1 or T3 system that it is desired to reroute. The TOOL may be modified to account for each different type of DACS in each central office that the TMAS serves. There exist several different manufacturers of DACS frames (Lucent, Alcatel, and the Tellabs Titan system, to name a few) and the specific characteristics for multiplexing, demultiplexing and cross-connecting may require different command sets for each frame type.

The DACS II is a DS0 cross-connect. In one embodiment of the present invention DACS 220 is a DACS III and DACS 240 is an Alcatel 1631 or DCS 3/1 (which will be described further in conjunction with a discussion of FIG. 3). In another embodiment, DACS 220 is a DACS II. The maintenance and surveillance system would change in this DS0 example to a system having the capability to maintain a DACS II frame. Thus, the following wired trunking configurations are supported: DACS III to DACS 3/1; DACS II CEF to DCS 3/1; DACS III to DACS III or DACS IV 2000 512 to DACS III.

The present invention may be extended to a synchronous optical network (SONET). A SONET DACS is currently under development. A transport envelope for a SONET digital signal stream would comprise STS1, OC3, OC12, OC96 and so on. However, the DACS will comprise the same functionality including multiplexing of digital optical signals and multiplexing.

In operation, for example, the present invention may be applied to advantage in several potential applications including but not limited to circuit rearrangement, maintenance reroute and restoration of failed or impaired service. Circuit rearrangement may be defined as the temporary transfer of a circuit to an alternate path for the purpose of making a permanent change in the path or permanent install of new equipment (i.e. a new T3 frame installed or replacement of equipment) and then returning the circuit to normal operation on the new or replaced path. A maintenance reroute is a short term reroute to repair or replace a path component and return the circuit to its original path. routine maintenance may identify an intra-office trunk 235 requiring connector replacement. A restoration of a failed facility is an emergency reroute to correct a current or imminent failure and return the circuit to its original path when the failure is repaired.

In operation and by way of example, a routine maintenance procedure may identify an intra-office trunk 235 requiring connector replacement. An operator of terminal 260a, preferably a DEMS terminal, or terminal 210a inputs identification data for intra-office trunk 235 and an alternative path 215, 230, 225 to intra-office trunk 235, if one exists, is identified to the operator on their display terminal via a correlating database. In many instances such alternative paths are provided for test and maintenance purposes via, for example, test frame 230 which may be a digital test maintenance frame. Dashed lines between terminal 210 and DACS frame 220 and 240 and test frame 230 represent alarm status and control links between a centralized maintenance center where the terminal 260a is located and digital data processors that control the DACS frames 220, 240 and test frame 230. Having been signaled of the availability of alternative path or paths 215, 230, 225 between DACS frames 220 and 240 for intra-office trunk 235, the operator may obtain a print out of the existing T3 or T3's being remapped. The operator may perform a number of checks to insure that the T3(s) may be remapped and then lock or freeze the DACS frame to insure that no provisioning work is done while the TOOL is operating. The operator then may input a command to the terminal 260a to effectuate the rerouting of intra-office trunk 235 via the alternative path. The TOOL then indexes the T1 paths and notes the T3 format of the current path as ASYNCH or CBIT.

Frames and bays of equipment and identity of ports and connectors and the like require one designing a system according to the present invention to reduce every event that happens or can happen to "states" of events and possible events. In so doing, and by way of example of the process, the TOOL may determine the primary and secondary state of a re-map T3 port as follows:

PST=IS TOOL will check SST
SST=SDEE or NULL
TOOL edits FMT of re-map T3 to match original T3
TOOL enters T1's of re-map T3
PST=IS TOOL will check SST
SST=TRM and SDEE where NULL, SDEE and the like are examples of facility states.

The TOOL then outputs message that the re-map port is OOS-MA and it ceases.

If the re-map port is available and ready for use (as determined, for example, by the operator's response to continue) the TOOL then goes into either a transmit or receive subroutine based on the direction of transmission.

In the transmit routine, the TOOL pauses for the operator to 1) test the T1's at the network element, 2) establish a T1 service monitor and 3) perform a network element roll. In the receive routine, the TOOL pauses for the operator to 1) perform a network double feed to re-map cable 2) test the network element for T1 service (using, for example, DCS 3/1) and 3) establish a T1 service monitor (as in the transmit routine). The operator then chooses whether to continue or abort.

If the operator chooses to continue, the cross connects are deleted for the original T3 and port, and the service is now working on the re-map T3's. The operator will instruct the maintenance personnel to perform their necessary work (for example, replace a deteriorated connector) and then run the TOOL again to put service back on the original T3's and ports.

On the other hand, if the operator chooses to abort, the cross connects are deleted for the re-map T3 and service is not moved.

In a further embodiment the individual DACS frames 220, 240 may represent the cross-connecting of T3, T1, DS0, OC3, OC12 or other digital intra-office trunk facilities that may be any of copper twisted pair, optical fiber or other digital signal facility.

A typical trunk is identified as an end-to-end T1, for example, 101 T1 dllstxlkzz atlngalkzz where dllstx is the Common Language Location Identification (CLLI) code for Dallas, Tex. and atlnga is the CLLI code for Atlanta, Ga. The T1 route through the central office equipment is typically indicated on a circuit order card representing a data file within the Trunk Integrated Record Keeping System (TIRKS). The card contains the port assignments or tie down assignment at the equipment it passes through. The same is true for a T3 trunk—for example, the 1 T3 dllstx02 kscyks03. . . where kscyks represents Kansas City, Kans. The originating path is identified by the surveillance system T3 or T1 and appears on a screen which points to the faulty equipment (for example, causing a high bit error rate, short or open circuit). Based on the signature and some trouble shooting, if the fault is detected between the two DACS frames 220,240, then the restoration is enacted. The reroute is selected from the predetermined inter-DACS port assignment or from a spare set of inter-DACS ties, if they are available, or other spare tie means. The spares are maintained as a list of unassigned ports in memory of the OSDS system. As explained above, OSDS is associated with TMAS 210 and with DEMS 260 with a modified version of which the present TOOL is associated.

Figure 3:
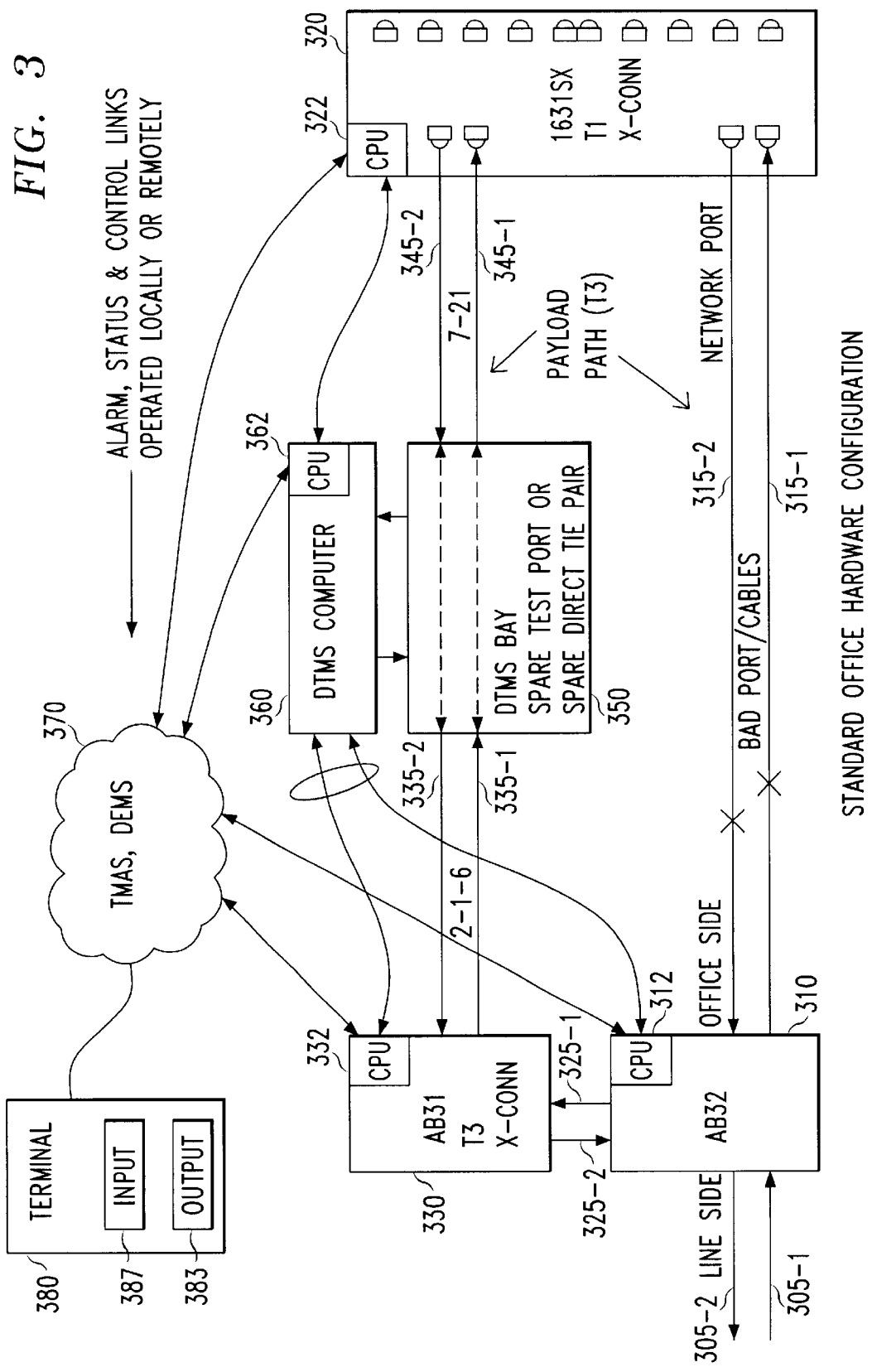
FIG. 3 provides a detailed schematic block diagram of the present invention as applied to the rerouting of a T3 digital carrier trunk group of twenty-eight channels in one preferred embodiment.

FIG. 3 provides a detailed schematic block diagram of the present invention as applied to the rerouting of a T3 digital carrier trunk group of twenty-eight channels in one preferred embodiment. Between AB 32 cross-connect frame 310 and T1 cross-connect 1631 SX frame 320 there are shown some bad port or cable 315-1 (in the direction from frame 310 to frame 320) and port or cable 315-2 (in the direction from frame 320 to frame 310) that require rerouting due to rearrangement, maintenance, or restoration, denoted by the X's. TMAS, DEMS 370 is shown as a network cloud for coupling display terminal 380 having an input interface 387 and an output interface 383, for example, a display to all the elements of the system that may provide an alternative routing. Consequently, TMAS, DEMS cloud 370 may communicate with depicted elements via alarm, status and control links that are operated locally (within the impacted toll office) or remotely. AB31 and AB32 represent, for example, two DACSIII frames. These will provide an alternate route for indicated bad ports or connectors or links. AB31 may represent the office side of the intraoffice facility and 1631 SX may represent the network side. There could have been depicted just one frame involved in the reroute or more than two, so long as they are interconnected. These reroute elements include frames AB32 and AB31 which have control processors 312 and 332 respectively for communicating with TMAS, DEMS cloud 370. CPU's 312 and 332 in turn communicate with DTMS computer 360 which further has a CPU 362 for communicating with TMAS, DEMS network cloud 370 and with CPU 322 of the Alcatel 1631SX frame 320. The numbers 2-1-6 represent an example of a port assignment on AB31 and the numerals 7-21 represent an example of a port assignment on 1631 SX.

In the event link 315-1, 315-2 fails or requires rearrangement or maintenance, a link is obtained via alternate links tie pairs 325-1, 325-2 assigned frame port 2-1-6 for 335-1, 335-2 of the AB31 and assigned frame port 7-21 for 345-1, 345-2 which are the alternate assigned ports of the AB31 and 1631 SX 320 shown. In the event link 315-2 fails in the other direction of transmission, the alternate path follows port 7-21 345-2 via bay 350 to link port 2-1-6 335-2 and tie pair 325-2 to AB32 310. Thus, a payload (data or voice) path for a T3 facility may be rerouted according to the present invention via alternatively and temporarily assigned facilities. Once the port, connector or cable has been maintained or replaced, service may be switched back to facilities 315-1 or 315-2 respectively.

Figure 4:
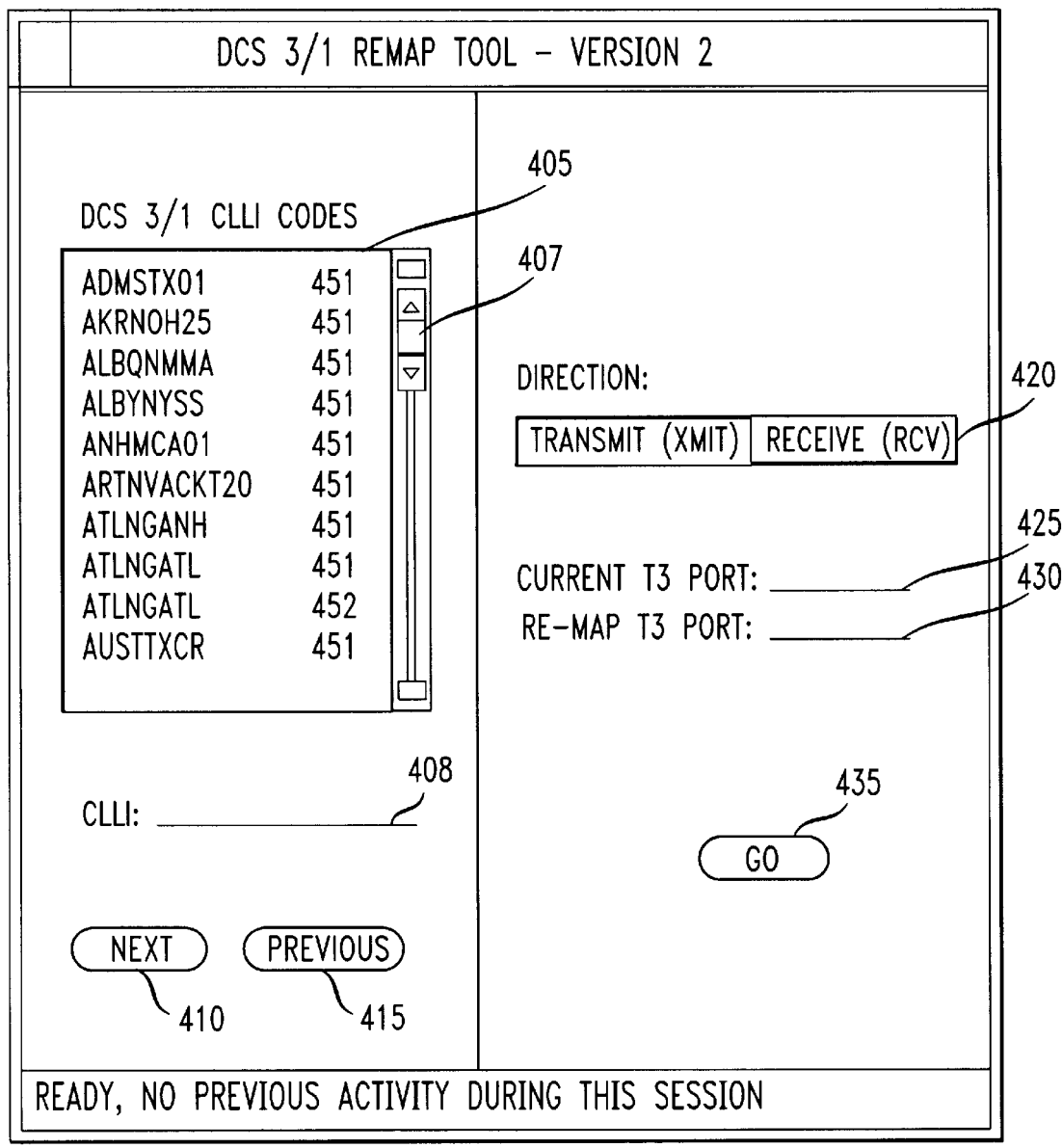
FIG. 4 is a typical computer display screen provided by the TOOL of the present invention applied to an Alcatel 451/452 type central office DACS frame, the display screen contents being displayed to a user of the system for operatively controlling the rerouting of a digital intra-office trunk.

Referring to FIG. 4, the TOOL operation will be explained with reference to an exemplary screen display. A user of the TOOL at terminal 260a preferably may only be an authorized user and must sign in to the system via appropriate security log-in means known in the art. Other screen layouts for TOOL operation may serve to advantage, the screen of FIG. 4 being a preferred embodiment. The screen display of FIG. 4 is limited to an Alcatel DCS 3/1 remapping or rerouting of DCS 3/1 CLLI, common language location identification code identifiers for Alcatel 45x designated DCS 3/1 frames. A similar screen may be used for other forms of DACS frames. Prior to the display of the screen of FIG. 4, another screen displays to a user a troubled or out of service trunk and trouble shooting is performed as explained above to identify the problem equipment, wire, connector or circuit. Having identified the troubled intra-office trunk, the user calls up the TOOL screen display of FIG. 4.

The screen display of FIG. 4 is entitled "DCS 3/1 ReMap Tool—Version 2" to indicate the identity of the software and its version number. To the left of the display is a window 405 entitled "DCS 3/1 CLLI CODES" to identify what is in the window 405. The window 405 provides space for listing up to, for example, ten Common Language Location Identification or other means of identifying frame ports for intra-office trunks, for example, in alphabetical order. Numerical lists or other ways of identifying intra-office trunks should be encompassed within the scope of the present invention. Of course, all frame ports may be obtained and displayed within window 205. There is an up/down arrow 407 that may be used to scroll up and down in the list of DCS 3/1 frames of intra-office trunk ports. Using a mouse or other means, a user drag arrow 407 and then may highlight, for example, AKRNOH25 (Akron, Ohio 25) 451 as the Alcatel 451 frame code identity of the trunk port. Alternatively, the user may begin to type in a code to CLLI line 408 and the code will appear on line 408 once it is uniquely identified as is well known in the art. The window 405 may also provide an alphabetical scroll to the desired frame and trunk port, for example, when the user begins to enter dllstx via a computer terminal keyboard. In future embodiments, speech recognition of trunks may be utilized for entering frame, port or trunk identity data.

Assuming that the user has highlighted Akron, Ohio 25 451, the user then users a screen toggle 420 to toggle between either transmit or receive direction (for example, to or from Akron). The direction of the TOOL use may be predetermined by the Alcatel frame. When the user clicks on Receive (RCV) then Receive (RCV) appears as a foreground and Transmit (XMIT) appears in the background (as shown). When the user clicks on Transmit, then Transmit appears in the foreground.

Assuming the data has been entered into the screen, then the current T3 port assignments 425 and Re-Map T3 port assignments 430 will pop up on the screen for the highlighted frame for cross connecting intra-office trunks. The user then may enter the current and new T3 port assignments. The user then must click on "go" within area 435 to continue. Again, many of these functions may be implemented in an alternative embodiment by voice command and response. To be sure, a screen or verbal response may display or say "Are you sure you want to remap?" The user must then click on "go" again or say go again. This security feature is necessary because there may be some service interruption associated with a trunk remapping operation.

Thus there has been described in some detail a method and apparatus for rerouting digital intra-office trunks, for example, due to a failure or imminent failure of faulty or old wiring, wiring connectors, equipment or circuits or to perform maintenance reroutes or circuit rearrangement. Modifications and alternative features may come to mind of one of ordinary skill in the art. While the present invention has been described with reference to one Alcatel DACS 1631 SX product, other product and other digital trunk cross connect frames may be rerouted as well. Any US patent referred to herein should be deemed to be incorporated by reference as to its entire contents. The invention should only be deemed to be limited in scope by the claims that follow.

What we claim is:

1. A method of rerouting an intra-office digital signal through a telephone central office comprising the steps of:
    storing identification data for ports of first and second digital access and cross-connect systems, the ports being connected by an intra-office digital trunk;
    storing identification data for an alternative path from said first cross-connect system to said second cross-connect system;
    correlating identification data for said alternative path to said identification data for said intra-office digital trunk;
    determining availability of and displaying alternative path data responsive to entry of identification data for said intra-office digital trunk;
    freezing or locking said first and second digital access and cross-connect systems to temporarily prevent any provisioning;
    rerouting said intra-office digital signal via said alternative path; and
    measuring data bit errors associated with a port, determining if a bit error rate for said port exceeds a threshold and displaying identification data for said port based on the bit error rate determining step.

2. A method as recited in claim 1 further comprising the steps of detecting and displaying if the bit error rate for said port no longer exceeds the threshold, and rerouting said intra-office digital link via said port responsive to operator control.

3. The method of claim 1 wherein rerouting said intra-office digital signal via said alternative path is in response to operator control.

4. The method of claim 1 further comprising in advance of said rerouting:
    running a testing and service subroutine, and then determining under operator control whether to continue with said rerouting or to abort.

5. The method of claim 1 further comprising in advance of said rerouting:
    running under operator control either a transmit or a receive subroutine for testing and service based on a direction of transmission.

6. The method of claim 5 wherein said transmit subroutine is different from said receive subroutine.

7. A method of rerouting an intra-office digital signal through a telephone central office comprising the steps of:
    storing identification data for ports of first and second digital access and cross-connect systems, the ports being connected by an intra-office digital trunk;
    storing identification data for an alternative path from said first cross-connect system to said second cross-connect system;
    correlating identification data for said alternative path to said identification data for said intra-office digital trunk;
    determining availability of and displaying alternative path data responsive to entry of identification data for said intra-office digital trunk;
    freezing or locking said first and second digital access and cross-connect systems to temporarily prevent any provisioning;
    rerouting said intra-office digital signal via said alternative path, wherein said rerouting comprises a rerouting for systematic replacement of one of cable connectors or cables; and
    after said systematic replacement, detecting and displaying if the bit error rate for said port does not exceed a threshold, and rerouting said intra-office digital link via said port responsive to operator control.

8. The method of claim 7 wherein rerouting said intra-office digital signal via said alternative path is in response to operator control.

9. The method of claim 7 further comprising in advance of said rerouting:
    running a testing and service subroutine, and then determining under operator control whether to continue with said rerouting or to abort.

10. The method of claim 7 further comprising in advance of said rerouting:
    running under operator control either a transmit or a receive subroutine for testing and service based on a direction of transmission.

11. The method of claim 10 wherein said transmit subroutine is different from said receive subroutine.

* * * * *